United States Patent [19]

Mullins

[11] Patent Number: 4,778,303

[45] Date of Patent: Oct. 18, 1988

[54] QUICK CHANGE GEAR APPARATUS

[75] Inventor: Dennis R. Mullins, Oakwood, Ohio

[73] Assignee: Dana Corporation, Toledo, Ohio

[21] Appl. No.: 30,933

[22] Filed: Mar. 26, 1987

[51] Int. Cl.$^4$ ............................................. B25G 3/00
[52] U.S. Cl. ..................................... 403/11; 403/260; 403/261
[58] Field of Search ............... 403/260, 259, 258, 261, 403/11

[56] References Cited

U.S. PATENT DOCUMENTS

| | | | |
|---|---|---|---|
| 204,954 | 6/1878 | Decker | 403/258 |
| 722,909 | 3/1903 | Runge | 403/261 |
| 1,037,747 | 9/1912 | Elliott | 411/539 |
| 1,262,924 | 4/1918 | Crippen | 403/261 |
| 1,371,212 | 3/1921 | Adams et al. | 474/48 |
| 2,497,217 | 2/1950 | Hall | 51/168 |
| 2,726,524 | 12/1955 | Gorin | 403/360 |
| 2,901,214 | 8/1959 | Slemmons | 403/260 |
| 3,146,010 | 8/1964 | Dellith | 403/261 |
| 3,181,902 | 5/1965 | Aitken | 403/258 |
| 3,347,110 | 10/1967 | Wilson | 403/259 |
| 3,709,530 | 1/1973 | Redding | 403/360 |
| 4,295,753 | 10/1981 | Luerken et al. | 403/365 |
| 4,411,549 | 10/1983 | Sheppard | 403/258 |
| 4,461,195 | 7/1984 | Barnick | 403/259 |
| 4,504,180 | 3/1985 | Ishii et al. | 411/539 |

*Primary Examiner*—Andrew V. Kundrat
*Attorney, Agent, or Firm*—Frank B. McDonald

[57] ABSTRACT

A quick change gear apparatus provides a system which shortens time of spindle machine gear changes to approximately ten percent of that previously required for gear change operations. In a preferred form, the apparatus includes a cylindrical spacer juxtaposed against a face of a gear which is secured between the spacer and a shoulder on a gear shaft. A split washer is also employed to permit the quick change operation by virtue of the loosening of a cap screw secured in a free end of the gear shaft. The cap screw contains a head which retains the split washer and assures that the split washer is urged axially against the spacer and gear members on the shaft. A partial turn of the cap screw will enable radial removal of the split washer, to thereby permit subsequent axial removals of the spacer and gear.

10 Claims, 1 Drawing Sheet

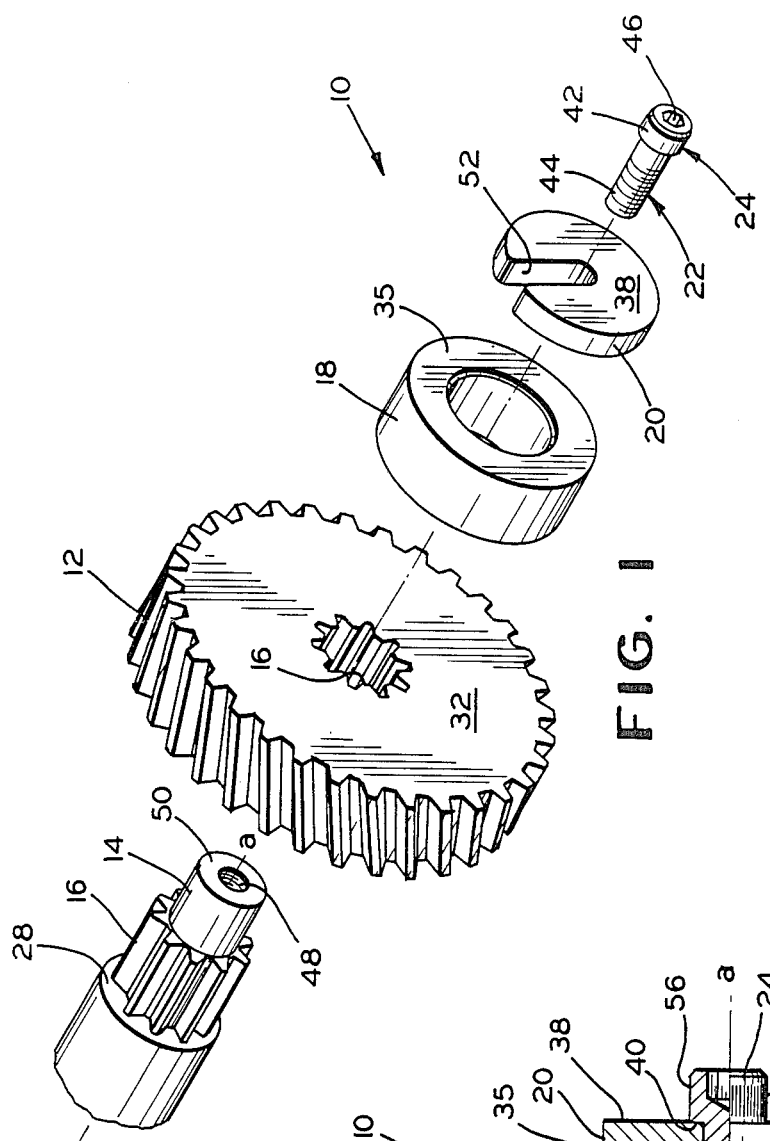
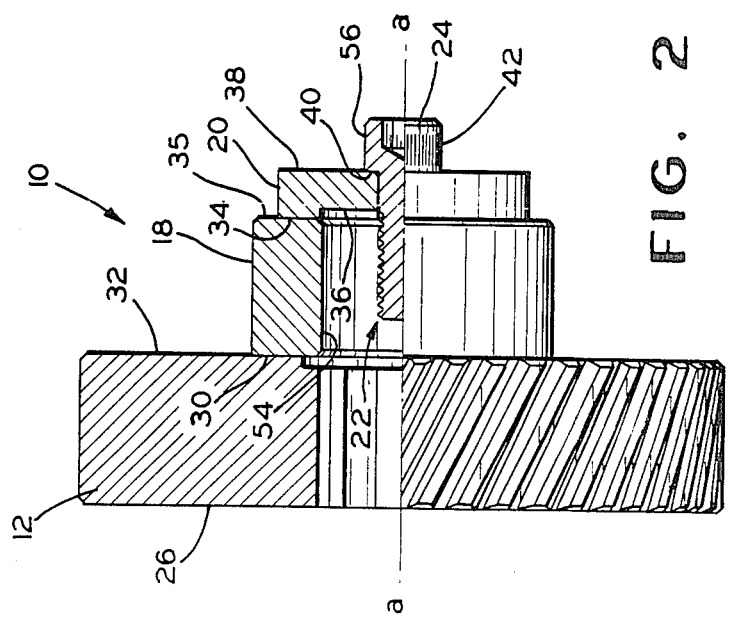

QUICK CHANGE GEAR APPARATUS

BACKGROUND OF THE INVENTION

This invention relates to apparatus for retaining gears on multiple spindle gear shafts. More particularly, this apparatus relates to a system of quick removal and installation of gears for effecting gear change operations, as required for certain types of machine tools.

In the prior art, changing spindle gears has typically required a relatively lengthy period of time, involving cumbersome mechanical efforts. More often than not, such operations involve the change of a plurality of such gears, which exacerbates the amount of time required to carry out a given machine tool changeover. In most cases, the gear change involves the removal of split nuts from the ends of several shafts, and removing the gears, installing the new gears and replacing the split nuts. Removal of the split nuts requires the use of an Allen wrench to first frictionally release the split nut from the shaft, wherein the split nut must then be unscrewed from the end of the shaft. After a new gear is installed on the shaft, the split nut is threaded back onto the shaft, and an Allen wrench bolt is reinserted to fix the split nut in place on the shaft against the new gear. What has been needed is a quick change method which would simplify the effort and reduce the time required for gear change operations in the multiple spindle machine tool industry.

SUMMARY OF THE INVENTION

A quick change gear apparatus disclosed herein provides a convenient system of gear removal and replacement in a fraction of the time required for prior art systems. In a preferred form the assembly provides a modification of the old prior art split nut and set screw devices utilized to secure and retain the gears on gear shafts. The preferred apparatus includes a spacer member, a C-washer juxtaposed thereagainst, and a threaded securement member to hold the latter members in place.

The spacer member is utilized to take up the distance between the front face of a gear on a gear shaft and the end of the shaft. The C-washer, removed radially upon a partial loosening turn of the threaded securement member, such as a cap screw, is held in place by the securement member, which is in turn secured in a bore at the free end of the gear shaft. In a preferred form, the C-washer includes a counterbore in the rear face thereof to enhance its mating interface with the front face of the spacer. Also, in the same preferred embodiment, the spacer and C-washer members are made of tool steel, and are hardened and ground, to afford greater dimensional tolerance precision.

BRIEF DESCRIPTION OF THE DRAWINGS

FIG. 1 is an exploded perspective of a preferred embodiment of the quick change gear apparatus of the present invention.

FIG. 2 is a side elevation, in half-section, of a gear, a spacer, a C-washer, and a cap screw as utilized in the preferred embodiment of FIG. 1.

DETAILED DESCRIPTION OF A PREFERRED EMBODIMENT

Referring initially to FIG. 1, a quick change gear assembly 10 constructed in accordance with the present invention is shown. The assembly 10 includes a gear 12 designed to be supported upon a cantilevered gear shaft 14 via mating splines 16 on respective gear and shaft members. It will be appreciated by those skilled in the art that the splines will enable the gear 12 to rotate positively with the shaft 14, and hence to ensure that the two members will rotate as a directly coupled unit.

A spacer 18, and a split washer 20 (also variously called a C-washer) are secured axially against the gear 12 by means of a threaded member 22, which in the presently preferred embodiment is a cap screw. The cap screw 22 includes a head 24 which bears against the C-washer 20 which in turn urges the spacer 18 against the gear 12 in order to hold the back face 26 (FIG. 2) of the gear 12 against a shoulder 28 on the gear shaft 14.

Referring now more particularly to FIG. 2, it will be appreciated that upon securement of the gear 12, the back face 30 of the spacer 18 will bear against the front face 32 of the gear 12. The back face 34 of the C-washer 20 will bear against the front face 35 of the spacer 18. To enhance the contact interface between spacer and C-washer, the back face 34 of the C-washer is counterbored as shown at 36. The front face 38 of the C-washer 20 is retained by a radial engagement surface 40 of the cap screw head 24.

Now referring back to FIG. 1, it will be appreciated that the shaft portion 44 of the cap screw 22 is threaded, and hence must necessarily be rotated for insertion into a matingly threaded bore 48 in the radial extremity 50 of the gear shaft 14. For this purpose, a hex head socket 46 is disposed for receiving a tool member, as an Allen wrench in the present case, for mechanical rotation, thereby aiding in the insertion and removal of the cap screw from the bore 48. The bore 48 is preferably drilled and tapped coincidentally with the axis "a—a" of the gear shaft 14, and is hence symmetrically positioned at the center of the gear shaft, although theoretically it may be offset.

For convenience, the head 24 is also knurled about its circumference as shown at 42 for tightening or removal of the member 22.

It will be noted that the C-washer 20 includes a radially extending slot 52 which provides for radial installation and removal of the C-washer from the threaded shaft portion 44 of the cap screw 22. The C-washer will be effective to axially retain the spacer and gear members as the spacer will have a smaller inside diameter 54 than the outside diameter of the C-washer. Moreover, the width of the C-washer slot 52 will necessarily be less than the diameter of the cap screw head 24 in order for the head to afford securement as herein described.

For removal of a gear utilizing the quick change apparatus 10 of the present invention, the screw threads of 44,48 are preferably arranged so that one needs only to rotate the hex headed cap screw 22 by a partial turn; approximately ninety to one-hundred eighty degrees of rotation at most. Upon such loosening, the C-washer 20 may then be radially removed via the slot 52. At this point, the spacer 18 is axially removed from the shaft 14, as its internal diameter 54 will be greater than the outside diameter of the head 24 of the cap screw 22. Finally, the gear 12 is axially removed from the shaft. It will of course be appreciated that the shaft will in all instances have a diameter which is greater than that of the head 24. Hence, the internal diameters of both the spacer 18 and gear 12 will be greater than the outside diameter of the cap screw head and, hence the spacer and gear will therefore both readily pass over the cap screw head 24 upon their removal. The installation of a new gear is achieved by the reversal of the steps outlined for removal.

In the preferred embodiment of FIGS. 1 and 2 the spacer width will be such that the combination of gear 12 and spacer 18 will fully overlie the shaft 14. Thus referring to FIG. 2, it will be appreciated by those skilled in the art that no portion of the C-washer will overlie the shaft 14. Thus, the C-washer will radially engage only the threaded shaft portion 44 of the cap screw 22, and hence the width of the C-slot 52 will be substantially equal to the diameter of the portion 44, although necessarily greater, not less.

Although only one preferred embodiment has been detailed and described herein, the appending claims will cover other embodiments not specifically disclosed herein, to the extent they fall within the spirt and scope thereof.

What is claimed is:

1. In a machine assembly containing a gear on a cantilevered gear shaft, said shaft having a radial extremity and including a shoulder spaced from said extremity, said gear defining an inner diameter and means therein for ensuring direct and positive rotation of said gear with said shaft, said gear being positioned on said shaft in abutting relationship with said shoulder, and apparatus on said shaft for retaining said gear axially on said shaft; an improvement in said apparatus comprising means for making a quick gear change, said means including a spacer comprising an inner diameter and positioned thereon about said shaft, said spacer adapted to abut said gear while the gear is disposed on the shaft against said shoulder, a C-washer positioned adjacent said extremity of the shaft and disposed in abutting relationship with said spacer, said C-washer comprising a slot extending radially outwardly from its center, said C-washer being disposed for radial installation adjacent said spacer via said slot, said shaft containing a threaded aperture in said extremity, a threaded fastener extending coaxially with said shaft in engagement with said threaded aperture, said threaded fastener including a threaded shaft portion and a separate head portion having an outer diameter larger than the width of said slot, but wherein said head portion outer diameter is smaller than the inner diameters of said spacer and said gear, whereby said spacer and gear can be axially removed from said shaft after (1) loosening said threaded fastener, and (2) radially removing said C-washer, and wherein said means for insuring direct and positive rotation of said gear with said shaft comprises internal splines on said gear and external splines on said shaft for mating with said splines on said gear, and wherein said C-washer contains a counterbore in one side thereof which abuts said spacer.

2. The apparatus of claim 1 wherein said slot of said C-washer has a width less than the outer diameter of said gear shaft.

3. The apparatus of claim 2 wherein said C-washer defines an outside diameter and wherein said spacer contains a smaller inside diameter than said outside diameter of said C-washer.

4. The apparatus of claim 3 wherein said cap screw head has a diameter smaller than the diameter of said gear shaft.

5. The apparatus of claim 4 wherein the spacer width is such that the combination of said gear and spacer fully overlie said gear shaft from said shoulder to said extremity.

6. The apparatus of claim 5 wherein said width of said slot of said C-washer is substantially equal to the diameter of said threaded shaft portion of said fastener.

7. The apparatus of claim 6 wherein said threaded fastener comprises a cap screw which includes a head having a hex head socket in its end.

8. The apparatus of claim 7 wherein said cap screw head also comprises a knurled surface about its circumference.

9. The apparatus of claim 8 wherein said spacer defines a cylindrical body coaxially positioned about said shaft.

10. The apparatus of claim 9 wherein said spacer defines a pair of radially extending ends, one of which bears directly against said side of said C-washer which contains said counterbore.

* * * * *